(12) United States Patent
Suits et al.

(10) Patent No.: US 6,924,644 B2
(45) Date of Patent: Aug. 2, 2005

(54) RADIOFREQUENCY SURFACE DETECTION COIL

(75) Inventors: Bryan H. Suits, Houghton, MI (US); Allen N. Garroway, Davidsonville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/662,163

(22) Filed: Sep. 12, 2003

(65) Prior Publication Data

US 2005/0057251 A1 Mar. 17, 2005

(51) Int. Cl.[7] .............................................. G01V 3/00
(52) U.S. Cl. ...................................... 324/318; 324/309
(58) Field of Search ................................. 324/318, 319, 324/322, 309, 307; 600/410, 409

(56) References Cited

U.S. PATENT DOCUMENTS

| | | | | |
|---|---|---|---|---|
| 4,636,728 A | * | 1/1987 | Compton et al. | 324/309 |
| 5,206,592 A | * | 4/1993 | Buess et al. | 324/307 |
| 5,229,722 A | * | 7/1993 | Rommel et al. | 324/307 |
| 5,233,300 A | * | 8/1993 | Buess et al. | 324/307 |
| 5,365,171 A | * | 11/1994 | Buess et al. | 324/307 |
| 5,608,321 A | * | 3/1997 | Garroway et al. | 324/307 |
| 5,891,031 A | * | 4/1999 | Ohyu | 600/409 |
| 6,054,856 A | * | 4/2000 | Garroway et al. | 324/318 |
| 6,278,276 B1 | * | 8/2001 | Morich et al. | 324/318 |

* cited by examiner

*Primary Examiner*—Brij B. Shrivastav
(74) *Attorney, Agent, or Firm*—John J. Karasek; L. George Legg (57) ABSTRACT

According to the invention, a magnetic field gradiometer detector for detecting a material of interest positioned in a detecting region outside the detector includes a transmitter for generating an output signal at a selected frequency, a receiver for detecting the signal, a probe, and a switch coupling the receiver and transmitter with the probe that alternately connects and disconnects the receiver and transmitter to the probe, switching between transmitting and receiving. The probe includes tuning elements and a gradiometer coil array. The gradiometer coil array includes a first surface coil and a second surface coil wound in an opposite sense, the probe having a first side and an opposite second side, with the first and second surface coils configured asymmetrically such that the probe projects a magnetic field in the outside detecting region adjacent to the first side while being self-shielded on the second side. Accordingly, the material of interest is detected with increased sensitivity and accuracy in the detecting region with the detector shielded from outside RF sources.

32 Claims, 8 Drawing Sheets

PRIOR ART

FIG. 1

PRIOR ART

*FIG. 2*

PRIOR ART

RADIOFREQUENCY SURFACE DETECTION COIL

TECHNICAL FIELD

The present invention relates to a coil for detecting a magnetic resonance signal induced in a sample and, more particularly, to a noise-immune coil having an optimized magnetic field strength in a specified inspection region outside the coil.

BACKGROUND ART

Magnetic resonance is useful to detect the presence of a specific substance in a sample. For example, generally, radio frequency (RF) radiation at a particular frequency will induce a magnetic resonance signal in a specific substance, but not in other substances. Therefore, the induced magnetic resonance signal can be detected to thereby indicate the presence of the specific substance.

It is common to detect a magnetic resonance signal by placing a sample to be measured in or near a tuned, electronically resonant tank circuit. Then, the response of the tank circuit to the electromotive force produced by nuclear or electronic spins in the sample is measured. With Nuclear Magnetic Resonance (NMR), Nuclear Quadrupole Resonance (NQR), and low-frequency Electron Paramagnetic Resonance (EPR) the sample is placed in or near an inductor, commonly referred to as a coil, that detects AC magnetic fields. The inductance of the coil is tuned with a parallel and/or series capacitance to make the circuit electrically resonant at the measurement frequency. One or more additional reactive impedances (inductors or capacitors) are typically added to adjust the resistive impedance at resonance to a particular value which optimizes the detection sensitivity.

NQR detection systems for the detection of explosives and narcotics, and various NQR concepts, are disclosed, for example, in U.S. Pat. No. 5,233,300, "Detection Of Explosive And Narcotics By Low Power Large Sample Volume Nuclear Quadrupole Resonance (NQR)"; U.S. Pat. No. 5,365,171, "Removing The Effects Of Acoustic Ringing And Reducing Temperature Effects In The Detection Of Explosives By NQR"; U.S. Pat. No. 5,206,592, "Detection Of Explosives By Nuclear Quadrupole Resonance"; U.S. Pat. No. 5,608,321, "Method And Apparatus For Detecting Target Species Having Quadrupolar Nuclei By Stochastic Nuclear Quadrupole Resonance"; and U.S. Pat. No. 6,054,856, "Coil Which Is Immune To Environmental Noise", all of which are incorporated herein by reference.

In most NQR, NMR and EPR applications, a common coil would typically be used as both a receiver coil and a transmitter coil, though this is not essential. In MRI separate coils would typically be used. The asymmetric gradiometer coils can be used for either or both of the transmitter and receiver coils.

Figure 1:
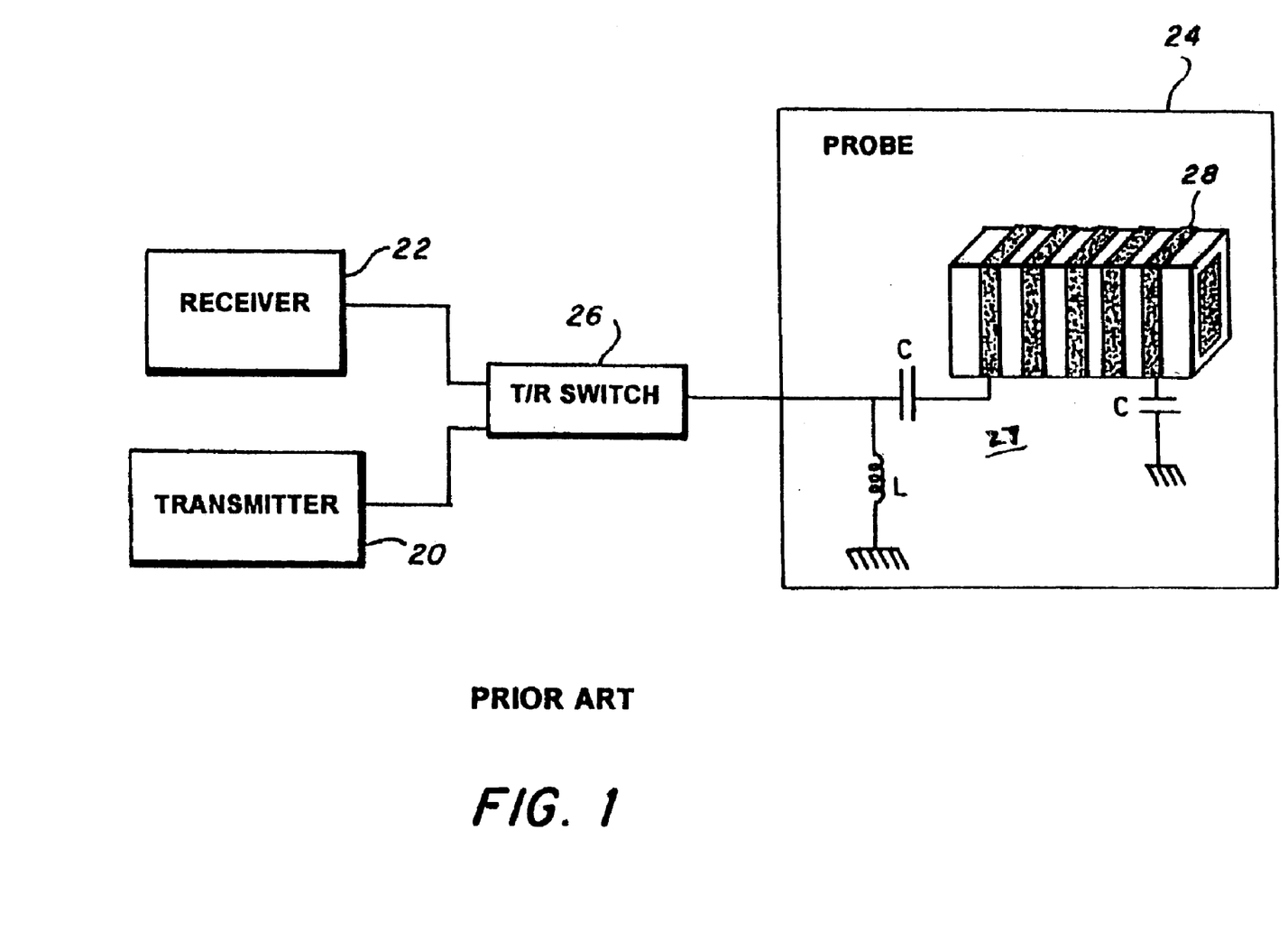
FIG. 1 (prior art) is a diagram illustrating an example of a conventional magnetic resonance apparatus.

FIG. 1 is a diagram illustrating an example of a conventional magnetic resonance apparatus. Referring now to FIG. 1, a transmitter 20 and a receiver 22 are connected to a probe 24 through a transmit/receive (T/R) switch 26. Probe 24 includes a coil 28, forming part of a resonant, tuned tank circuit 27 with various other inductors L and capacitors C as tuning elements. To detect the presence of a target substance, T/R switch 26 connects transmitter 20 to probe 24 while disconnecting receiver 22 from probe 24. Then, transmitter 20 generates a pulse and supplies the pulse to probe 24. As an example, in NQR, the pulse is formed from an RF signal having a frequency corresponding to the resonance signal of the target substance which is intended to be detected. Probe 24 receives the pulse, which causes coil 28 to store (RF) energy.

If a sample (not illustrated) is appropriately placed near or inside coil 28, the stored RF energy will cause a corresponding RF magnetic field to irradiate the sample. If the sample includes the target substance, the RF magnetic field will induce a magnetic resonance signal in the target substance. For example, if the apparatus operates under the principles of NMR (which includes Magnetic Resonance Imaging, MRI), then an appropriate NMR resonance signal will be induced. If the apparatus operates under the principles of NQR, then an appropriate NQR resonance signal will be induced.

After the sample is irradiated with the RF magnetic field, T/R switch 26 connects receiver 22 to probe 24 while disconnecting transmitter 20 from probe 24. Coil 28 then detects the resonance induced in the target substance, and probe 24 produces a corresponding output signal. The output signal of probe 24 is received and analyzed by receiver 22, to confirm the presence and/or measure the quantity of the target substance in the sample.

FIG. 1 is only one example of a magnetic resonance apparatus. For example, FIG. 1 illustrates T/R switch 26 to connect transmitter 20 and receiver 22 to the same probe 24. However, instead, a transmitter and receiver can each have a separate, dedicated probe together with a switch or gate for protecting the receiver while the transmitter is ON. Note that such an apparatus may also be used to measure material specific RF signals which arise from electromagnetic properties other than the magnetic resonance phenomenon.

Figure 2:
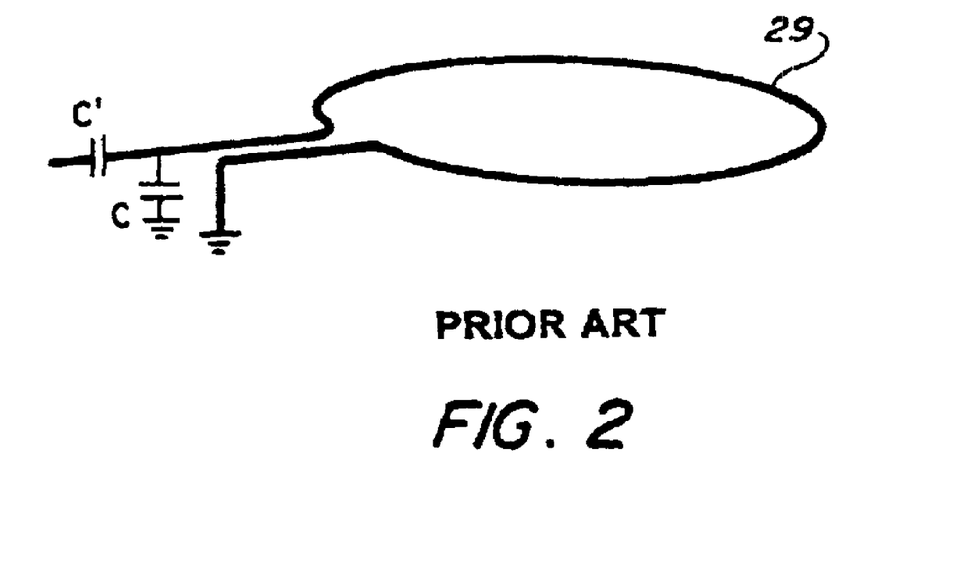
FIG. 2 (prior art) is a diagram illustrating a simple, conventional surface coil.

FIG. 2 is a diagram illustrating a simple, conventional coil which can be used in a probe. Referring now to FIG. 2, a coil 29 typically forms a loop. Typically, a tuning capacitance C and a matching capacitance C' are also provided. The coil shown has 1 turn, though additional turns are often used.

In magnetic resonance the signal-to-noise ratio (SNR) is determined, in part, by the noise contributions and the quality factor (Q) of the receiver coil. It is well-known that random thermal noise contributions typically arise from Johnson noise in the RF inspection coil and the first amplifier in the receiver. In the case where the probe cannot be electrically shielded, a further noise contribution arises from extraneous environmental noise.

It is also well-known in magnetic resonance that the Q of a receiver coil is determined not only by resistive loss in the windings of coil itself but also by loss in nearby electrically conducting materials that can dissipate energy from currents in the coil. As the SNR typically varies as $Q^{1/2}$, such electrical loss in the surroundings leads to a reduction in SNR. For example, in MRI, the main source of electrical loss can come from the patient, and not the receiver coil windings, as the water in the body has an electrical conductivity comparable to sea water. In NQR land mine detection it is found that some soils also present significant electrical loading to the receiver coil, leading to a decreased coil Q and decreased SNR.

In many applications in MRI and also in land mine detection, a surface coil is used for the inspection. The larger the surface coil, the more the receiver Q is decreased by the presence of electrically conducting materials in the surroundings. Indeed, in MRI, a system designer conventionally chooses as the receiver coil the smallest surface coil that will "cover" the region of interest.

For a conventional simple circular coil (FIG. 2) of radius R the RF magnetic field falls off with distance so the coil is very inefficient at receiving NMR or NQR signals much beyond a distance R. Hence, for applications such as MRI or land mine detection, the distance to the inspection or interrogation region of interest determines the minimum size of the coil which is useful. For such a circular coil on the surface of a large conducting volume, we find that approximately 65% of the electrical loss from this volume arises from regions that are deeper than a distance R below the surface. Hence, most of the loss comes from a region beyond the actual region that can be imaged (in MRI) or inspected (in NQR landmine detection).

Although an RF coil used as a detector in magnetic resonance is not specifically designed to detect or receive radio signals, the detection coil does tend to pick up such unwanted interference. This radio interference from radio stations or other RF noise sources in the relevant frequency range can overwhelm the magnetic resonance signals of interest. One solution is to employ an external RF shield surrounding the coil and sample, however, this is impractical in many applications and can unduly increase the cost and size of the system. For the simple circular coil, the susceptibility for receiving interference from distance RF sources increases in proportion to the square of the coil radius, R.

Accordingly, it is desired to reduce the environmental noise pickup and reduce the electrical loss due to the proximity of a conducting medium while at the same time keeping adequate sensitivity to the desired signal. Approaches for achieving this may employ detector (or transmitter) coils that are designed to (i) strongly reject electromagnetic environmental noise from more distant sources, (ii) to couple strongly to the desired signals that arise from the desired inspection region very near the coil, and (iii) to couple more weakly to other nearby electrically conducting materials.

In most NQR, NMR and low-frequency EPR applications, a common coil would typically be used as both a receiver coil and a transmitter coil, though this is not essential. In MRI separate coils would typically be used. By the principle of reciprocity, all coil designs can be evaluated by considering them for use as a transmitter even if the coil is ultimately intended to be used as a receiver. That is, if when used as a transmitter a coil produces a large magnetic field at a specified location, that same coil can be expected to be a good receiver for magnetic resonance signals arising from material at that location.

One approach to reduce interference is 'balancing', in which the interference enters but is arranged to cancel itself based on some property of the detection coil and the external interference. A gradiometer is one example of this approach, as it can be designed to respond to any order of the spatial derivative of the electric or magnetic field.

A conventional linear or first order gradiometer is primarily sensitive to the first spatial derivative of the field, and is correspondingly insensitive to field components that do not vary in space. Since the spatial variations of an electromagnetic wave are characterized by its wavelength, this provides a means to cancel fields that have wavelengths much larger than the characteristic size of the gradiometer, thereby reducing noise pickup from distant sources. (For example, the free space wavelength of a 1 MHz signal is 300 meters whereas the coils will generally be less than 1 m across.). A simple conventional (linear) magnetic field gradiometer is formed of two loops which are spatially removed from each other and have currents flowing in opposite directions.

Figure 3:
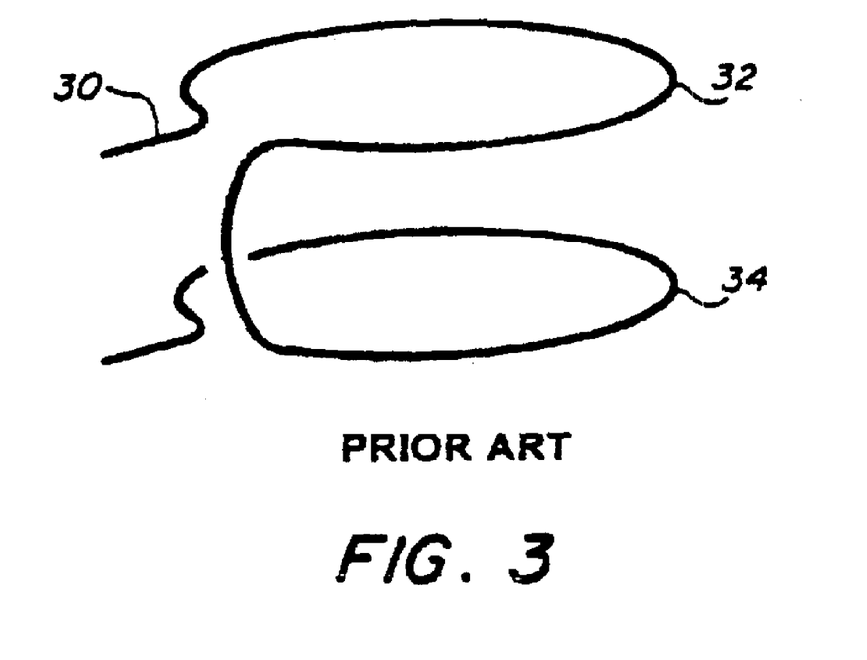
FIG. 3 (prior art) is a diagram illustrating a conventional magnetic field gradiometer.

FIG. 3 is a diagram illustrating a conventional magnetic field gradiometer. Referring now to FIG. 3, a conventional magnetic field gradiometer has a conductor 30 which forms two loops 32 and 34 of identical radii but wound in the opposite sense. Each of these loops may have more than 1 turn of wire. The direction of the current changes in coils 32 and 34, so that magnetic fields generated by coils 32 and 34 are opposite each other.

For an application such as buried land mine detection, the inspection volume is located in one half space (underground) and the detection apparatus is limited to the other half space (above ground). The coil is used as part of a tuned circuit to detect the NQR signal which for landmine detection is a narrowband (~1 kHz) signal in the range of 0.5–5 MHz. These NQR signals are very weak and RF interference is a major problem for such field work. While a conventional magnetic field gradiometer will reduce environmental magnetic field noise pick-up, the amount of reduction is often insufficient for many applications. In addition, there is also a reduction of the desired signal, compared to the simple circular coil, which is larger than desired. Here the use of an external RF shield, which must surround both the coil and the land mine, is not practical. It is therefore desirable to provide an improved gradiometer-type coil design having improved immunity to interference without extra shielding and at the same time providing an efficient detection region outside (i.e. near, but away from) the coil.

DISCLOSURE OF THE INVENTION

According to the invention, a magnetic field gradiometer detector for detecting a material of interest positioned in a detecting region outside the detector includes a transmitter for generating an output signal at a selected frequency, a receiver for detecting the signal, a probe, and a switch coupling the receiver and transmitter with the probe that alternately connects and disconnects the receiver and transmitter to the probe, switching between transmitting and receiving. The probe includes tuning elements and a gradiometer coil array. The gradiometer coil array includes a first surface coil and a second surface coil wound in an opposite sense, the probe having a first side and an opposite second side, with the first and second surface coils configured asymmetrically such that the probe projects a magnetic field in the outside detecting region adjacent to the first side while being self-shielded on the second side. Accordingly, the material of interest is detected with increased sensitivity and accuracy in the detecting region with the detector shielded from outside R sources.

Also according to the invention, a method for analyzing a sample by magnetic resonance includes the steps of (a) generating a train of radio frequency pulses having a predetermined frequency, (b) transmitting the train of radio frequency pulses to the magnetic gradiometer coil array, (c) irradiating the sample in response to the train of radio frequency pulses transmitted to the coil at step (b), (d) detecting a signal in response to irradiating the specimen at step (c), and (e) receiving the signal detected at step (d).

The invention provides improved immunity to interference from outside RF sources, reduced losses due to nearby electrically conducting materials, and an improved detection region outside the coil, thereby providing increased sensitivity for detecting small quantities of target materials. These properties are advantageous in many applications, such as in buried land mine detection and humanitarian de-mining, security inspections, contraband detection, and in geophysical surveying activities such as well logging.

Additional advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

BEST MODE FOR CARRYING OUT THE INVENTION

Reference will now be made in detail to the present preferred embodiments of the present invention, examples of which are illustrated in the accompanying drawings, wherein like reference numerals refer to like elements throughout.

Definition(s): As used herein, the term "asymmetric" when referring to the plural coils of a detector or coil array means that the coils are non-identical, that is, at least one coil of the plurality of coils has a different geometry, different number of turns or windings, or differs in some other physical or operating parameter from the other coil or coils of that embodiment.

Theory Used to Derive Coil Designs

For our purposes it is sufficient to assume that the RF frequency is low enough that displacement current terms can be neglected—that is, we are in the long wavelength limit. For NQR frequencies of the order of 1 MHz and coil dimensions of 1 m or less, this is a reasonable assumption. In addition, for this derivation we assume all regions outside the coils are free from magnetic, dielectric, and electrically conducting media and we specialize to the cylindrically symmetric problem with planar surface coils. We also will assume that the coil is designed and constructed so that it is sensitive only to magnetic fields and not directly to electric fields.

We first examine a single-layer coil and develop a computational methodology for optimizing the current distribution using a variational approach and/or a diagonalization of the corresponding eigenvalue problem. We then extend to the case of a gradiometer using two coaxial coils and demonstrate both theoretically and experimentally that such a coil can be constructed to be self-shielded in one half space but still produce a usable field in the other half space. We then consider the trade-off between SNR and immunity to RF interference for such a gradiometer when used for NQR detection.

Single-layer Coils

Figure 4:
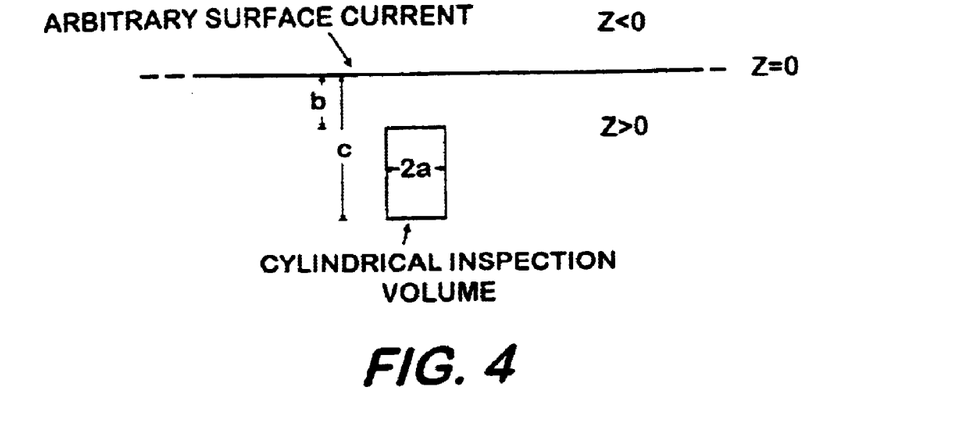
FIG. 4 is a diagram illustrating a basic coil geometry for use in deriving optimal coil parameters according to the invention.

We consider the basic coil geometry shown in FIG. 4. The inspection volume of interest is taken to be a cylinder of radius a in the half-space z>0. The coil is in the plane z=0. The ends of the cylinder are at z=b and z=c, b<c, as shown. The axis of the cylinder defines the z-axis of our cylindrical coordinate system. For the computations included here, units are chosen so that a=1. Our main goal is to maximize the field in the inspection region which is produced by the coil when used as a transmitter, while at the same time minimizing the field produced elsewhere.

In the region away from the coil, z≠0, it is straightforward to show that the general solution to Maxwell's equations in cylindrical coordinates, neglecting the displacement current term and restricted to finite solutions with cylindrical symmetry, can be written $$B_z = \int_0^\infty \alpha A(\alpha) J_0(\alpha r) e^{-\alpha|z|} d\alpha \qquad (1)$$

$$B_r = -\int_0^\infty \alpha A(\alpha) J_0'(\alpha r) e^{-\alpha|z|} d\alpha = \int_0^\infty \alpha A(\alpha) J_1(\alpha r) e^{-\alpha|z|} d\alpha$$

$$B_\theta = 0,$$

where $J_0$ and $J_1$ are Bessel functions and the "expansion coefficients," $A(\alpha)$, are at this point arbitrary. The boundary condition at $z=0$ provides the relation between the expansion coefficients and the surface current density, $K_c(r)$, $$K_c(r) \infty \ \hat{z} \times B(r, z=0) = B_r(r, z=0)\hat{\theta} = \hat{\theta} \int_0^\infty \alpha A(\alpha) J_1(\alpha r) d\alpha \qquad (2)$$

where the proportionality constant depends on the units used.

There are several useful quantities we will compute starting with equation 1. For example, the total energy in the magnetic field (in convenient units) is $$E_{tot} = \int_{all\ space} d^3 x |B|^2 = 4\pi \int_0^\infty d\alpha A^2(\alpha). \qquad (3)$$

For coils with uniform resistivity, the dissipation in our coil, W, is $$W \infty \int_0^\infty 2\pi r dr K_\theta^2 = 2\pi \int_0^\infty d\alpha \alpha A^2(\alpha) \qquad (4)$$

and the magnetic energy within the cylindrical inspection volume is $$E_V = 2\pi \int_0^a r dr \int_b^c dz |B|^2 \qquad (5)$$
$$= 2\pi \int_0^\infty d\alpha \int_0^\infty d\alpha' A(\alpha') G(\alpha', \alpha) A(\alpha),$$

where $$G(\alpha', \alpha) = a \frac{\alpha \alpha'}{\alpha^2 - \alpha'^2} \{e^{-(\alpha+\alpha')b} - \qquad (6)$$
$$e^{-(\alpha+\alpha')c}\}(J_1(\alpha a) J_0(\alpha' a) - J_0(\alpha a) J_1(\alpha' a))$$

and the proportionality constants for $E_{tot}$ and $E_V$ are the same.

It is useful to consider a discretized version of the above equations. That is, one considers N discrete values of $\alpha$ with spacing $\Delta\alpha$. Then the expansion coefficients A ($\alpha$) become a vector, A, of length N, and $G(\alpha',\alpha)$ becomes an N×N symmetric real tensor, G. Since N can be arbitrarily large and $\Delta\alpha$ arbitrarily small, for practical purposes this discretization can be considered a change only in notation. Later, we will use specific values for N and $\Delta\alpha$, in which case one should verify that A and G adequately represent the continuous functions in the regions where those functions are non-zero. Typically this verification is done by making a significant change to the sampling grid, N and/or $\Delta\alpha$, and verifying that the solution does not change significantly.

With this new notation, equations 3–5 become $$E_{tot} = A^T \cdot A$$
$$W = A'^T \cdot A'$$
$$E_V = A^T \cdot G \cdot A, \qquad (7)$$

where $A' = \sqrt{\alpha} A$.

The problem now is to determine an appropriate choice for A, from which the current densities can be computed using equation 2. We now consider several different criteria for choosing A.

One criterion to optimize is the "filling factor." While there is no precise definition of filling factor for the general surface coil case, we still wish to characterize the fraction of the total magnetic field which is in the inspection volume. Ideally this would be 100% so that all of the RF field produced would be useful. For our infinite region, we can define a filling factor, f as the ratio of the energy in the magnetic field within the inspection volume to the total magnetic field energy everywhere. That is, $$f = \frac{E_V}{E_{tot}} = \frac{A^T \cdot G \cdot A}{A^T \cdot A}. \qquad (8)$$

Since G is a symmetric real tensor, it can be diagonalized. The maximum value of f can thus be determined by finding the largest eigenvalue of G. The appropriate choice of A will then be the eigenvector corresponding to that largest eigenvalue.

There are two approaches we have looked at to determine A which produces the maximum value of f-a variational approached based on a numerical implementation of the continuous integral equations, and a numerical diagonalization of the discrete tensor, G, using standard numerical subroutines. Other methods can be used as well.

For the variational approach, a trial function with one or more variable parameters is used for A. The parameter(s) is (are) varied numerically to search for a maximum value of f. The trail function which gives the maximum value is then an approximation to the desired result. The method is time consuming and it may be necessary to test several distinctly different trial functions to achieve accurate results, but the variational approach is useful since it will provide a measure of the sensitivity to small changes in the function $A(\alpha)$, and hence the sensitivity to changes in the current distribution. In addition, there is considerable flexibility for choosing trial functions that match known physical situations which can be used for comparison.

Figure 5:
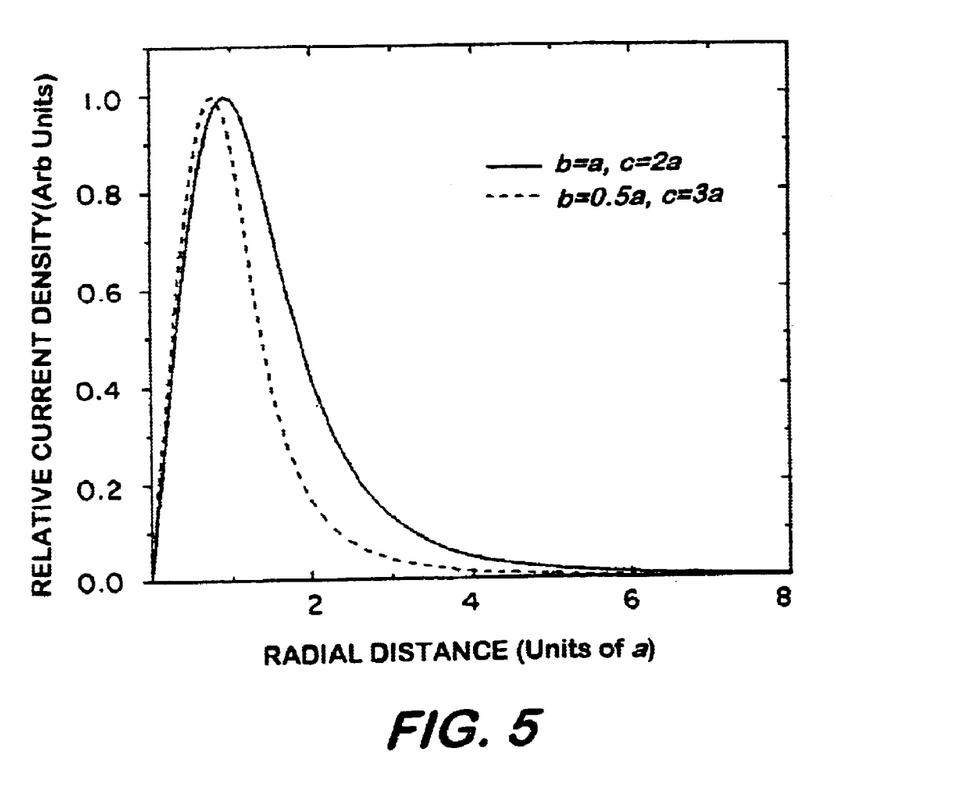
FIG. 5 is a graph showing the magnitudes of the ideal current densities computed using parameter f and a single-layer surface coil for two inspection volumes using the corresponding eigenfunctions.

Since $G(\alpha',\alpha)$ falls off rapidly when $|\alpha'-\alpha|>1/a$, a numerical diagonalization of G proceeds rather quickly. However, if N is made too large, numerical round-off problems may arise. We have used N as large as 200 with good results. The numerical diagonalization can be done on a desktop personal computer in less than 1 second. FIG. 5 shows the magnitudes of the current densities computed from the corresponding eigenfunctions for two different interrogation regions. The resulting values of f compare well with the largest values found using the variational technique and hence either technique can be used in practice.

Figure 6:
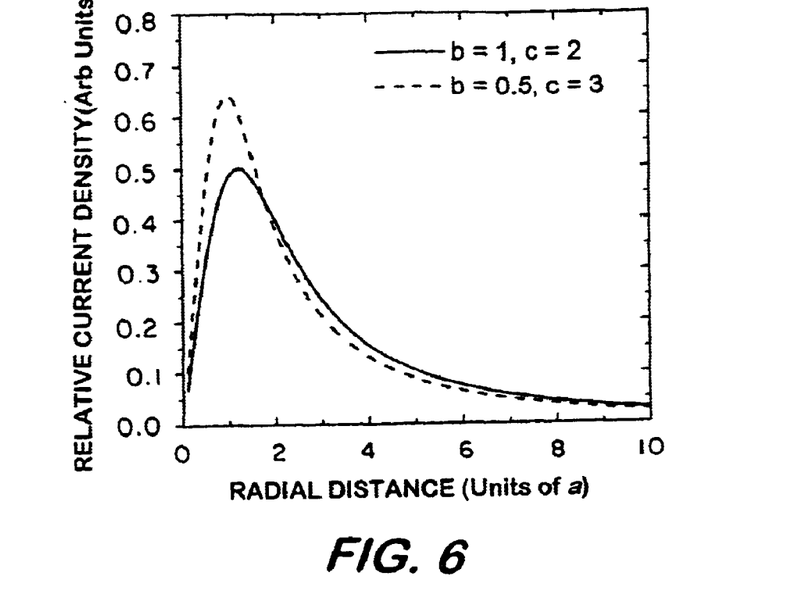
FIG. 6 is a graph showing the magnitudes of the ideal current densities computed using parameter g and a single-layer surface coil for two inspection volumes using the corresponding eigenfunctions.

Other parameters can be maximized in the same way. For example, to maximize the magnetic field energy in the inspection volume for a given power dissipation in the coil, the "excitation efficiency," we maximize $$g = \frac{E_V}{W} = \frac{A'^T \cdot G' \cdot A'}{A'^T \cdot A'}, \quad (9)$$

where $$G'(\alpha',\alpha) = G(\alpha',\alpha)/\sqrt{\alpha\alpha'} \quad (10)$$

which has the same mathematical form as was used for the filling factor. The procedure is then to diagonalize G' and find the eigenvector A' that has the largest eigenvalue. Then one computes A from A' and A is used to find the desired current densities as before. The current densities that maximize g (for the two inspection volumes used previously) are shown in FIG. 6. These current densities are very similar to those that maximize the filling factor, except the tail of the current density extends to somewhat larger r. The fact that these are similar means that a coil which approximates either of the two continuous distributions shown will be close to optimum for both of these, and other similar, criteria. For example, if one uses the results which optimize g, f is reduced by only about 10 to 15% and vice versa.

Above we have used as examples the two parameters f and g for the optimization. Of course other parameters, or modifications to these parameters, may be more appropriate for specific applications and are easily derived by those practiced in the art.

We do point out that not all parameters yield useful results. For example, the parameter q, defined by $$q = \frac{E_{tot}}{W} \quad (11)$$

is related to the quality factor of the coil. We find that when q is maximized, the resulting current density is nonzero only at infinite radius and that for finite currents the field produced is infinitesimally small. A similar aberrant solution results when one attempts to maximize the homogeneity of the magnetic field. In the limit, the field can be made exactly uniform (though vanishingly small) over the inspection volume by pushing the current density out to infinitely large r.

Two-layer Coils—the Self-shielded Axial Gradiometer

The geometry we consider here is identical to that for the single-layer coil except a second layer that may contain current is added at z=−d. Using subscripts 1 and 2 to represent the layer at z=0 and z=−d respectively, we write the total field as the superposition of the fields from the currents in the individual layers. That is, for example, $$B_z = \int_0^\infty d\alpha \alpha J_0(\alpha r)(A_1(\alpha)e^{-\alpha|z|} + A_2(\alpha)e^{-\alpha|z+d|}). \quad (12)$$

We can hope to achieve good noise immunity at low frequencies if the field produced by this coil is identically zero for z<−d, sometimes referred to as "supershielding." By reciprocity, the coil will not receive signals from interfering sources in that region. At RF frequencies and for distant sources such a solution is not easily achieved in practice, however the radiated energy—the "quadrupole radiation"—will be smaller than that of a comparably sized single-layer coil by a factor roughly equal to the ratio of the coil spacing to the wavelength. In our case the wavelengths range from 30 to 300 m while a representative spacing is 10 to 100 cm, and so this reduction can be quite substantial. This reduction is achieved with a configuration for which at dc (zero frequency, infinite wavelength) the supershielding condition is satisfied.

Figure 7:
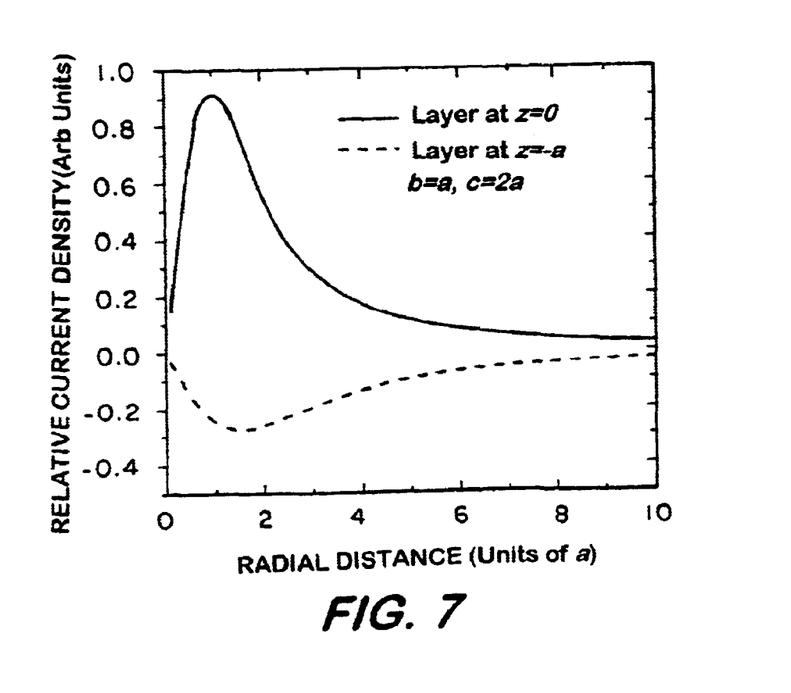
FIG. 7 is a diagram illustrating ideal current densities that maximize f for one inspection volume for a two-layer gradiometer surface coil according to an additional embodiment of the present invention. The solid line is the current in the layer that is near the inspection region, the dashed line in the layer which is away from the inspection region (the "shield layer").

Supershielding (at zero frequency) will be achieved if $$A_1(\alpha) = -A_2(\alpha)e^{\alpha d} \quad (13)$$

and with this condition, the field in the region z>0 (where the inspection volume is located) has the same mathematical form found for the single-layer coil, $$B_z = (z > 0) = \int_0^\infty d\alpha \alpha A_{eff}(\alpha) J_0(\alpha r)e^{-\alpha z} \quad (14)$$

where $$A_{eff} = A_1(1 + e^{-2\alpha d}) \quad (15)$$

and there is a similar expression for $B_r$. The total magnetic energy is $$\begin{aligned} E_{tot} &= \int_0^\infty 2\pi r dr \int_{-\infty}^\infty dz |B|^2 \\ &= 4\pi \int_0^\infty d\alpha A_1^2(\alpha)(1 - (2\alpha d + 1)e^{-2\alpha d}) \\ &= 4\pi \int_0^\infty d\alpha \, \alpha (\tilde{A}(\alpha))^2 \end{aligned} \quad (16)$$

where $$\tilde{A}(\alpha) = A_1(\alpha)/\sqrt{1 - (2\alpha d + 1)e^{-\alpha d}} \quad (17)$$

and so the filling factor can then be written as before $$f = \frac{A_{eff}^T \cdot G \cdot A_{eff}}{\tilde{A}^T \cdot \tilde{A}} = \frac{\tilde{A}^T \cdot \tilde{G} \cdot \tilde{A}}{\tilde{A}^T \cdot \tilde{A}} \quad (18)$$

where $$\tilde{G}(\alpha', \alpha) = G(\alpha', \alpha) \frac{1 - e^{-2\alpha d}}{\sqrt{1 - (2\alpha d + 1)e^{-2\alpha d}}} \quad (19)$$

$$\frac{1 - e^{-2\alpha' d}}{\sqrt{1 - (2\alpha' d + 1)e^{-2\alpha' d}}}$$

which is once again an eigenvalue problem. The largest eigenvalue of $\tilde{G}$ and corresponding eigenvector, $\tilde{A}$, are found. Then by working backwards, $A_1$ and $A_2$ and the corresponding current densities in the two layers are determined. FIG. 7 shows the results where f has been optimized for one particular inspection volume and spacing between the layers. The current in layer 2 is reduced compared to layer 1, and is pushed out to a larger radius—that is, the gradiometer produced is asymmetric. The negative contribution to the magnetic field within the interrogation region from layer 2 is significantly reduced compared to a symmetric gradiometer ($A_1 = -A_2$) with the same spacing. The net magnetic dipole moment, however, remains zero, at least within the accuracy of a numerical calculation. It is interesting to note that the filling factor, f, as defined above, for this two-layer coil is actually 30% larger than that of the corresponding optimized single layer coil.

A similar procedure would be used to derive ideal current densities for the parameter g, or other similar parameters.

Practical Implementation

For the design of real coils that produce a magnetic field which approximates the field found using the continuous theory above, there are several practical considerations. One obvious limitation is that the coil should be finite in size. For use under field conditions the coil assembly must ideally be small and lightweight, especially for a hand-carried device. For the cases we have considered, with the exceptions noted above, the current densities fall rapidly to zero with increasing radius and so in principle, size should not be a major problem.

In addition, while it is possible to produce a finite continuous sheet with variable resistivity in order to obtain a continuously variable current density, that is not an appropriate procedure here. The main goal here is to achieve a sensitive RF receiver coil. Adding resistance to the coil to control the current will, however, add noise which will subvert our attempts at making a sensitive receiver coil. That is, we desire approximate solutions that do not also unduly compromise the coil quality factor, Q.

Figure 8A:
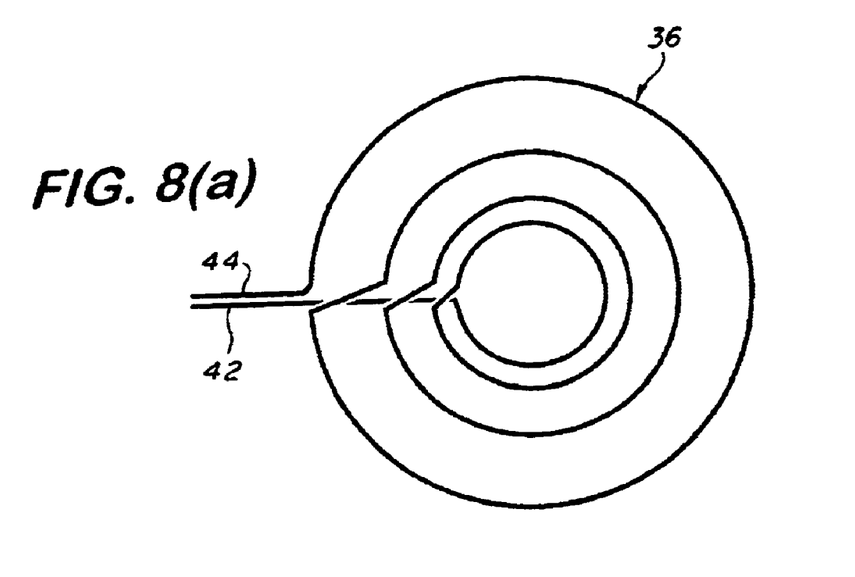
FIG. 8(a) is a schematic diagram illustrating a method to approximate the ideal current densities in one layer using unequally spaced circular windings.
Figure 8B:
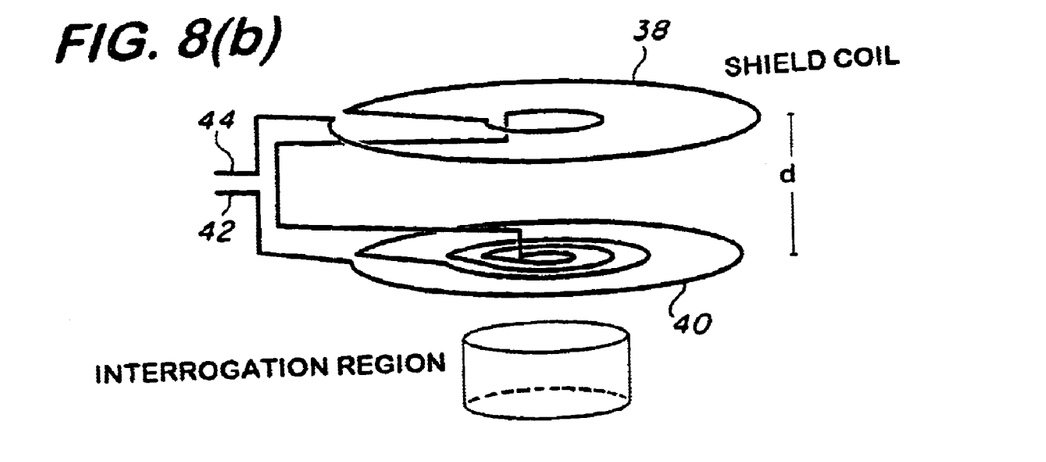
FIG. 8(b) is a schematic diagram illustrating the connections for a two-layer concentric loop coil, each layer being wound in a manner similar to that of FIG. 8(a), though with different numbers of windings and different spacings, and showing the coil interrogation region according to an embodiment of the present invention.

To approximate the continuous current density without severely compromising Q we use an array 36 of concentric circular loops 38 and 40 wired in series but with unequal spacings, as shown in FIGS. 8(*a*), 8(*b*), 9(*a*), and 9(*b*). Current is brought into and out of each loop 38 and 40 in the radial direction. The leads 42 and 44 are closely spaced (the spacing is exaggerated in the figure for clarity) and run in the radial direction and can be thought of as a short length of transmission line and will contribute an insignificant amount to the magnetic field in the inspection region and at larger distances. The spacing between the individual circular loops in each layer 38 and 40 is proportional to the inverse of the computed current density. Accordingly, coils 38 and 40 are stacked and wired in series, but with current flowing in the opposite sense. It is also possible to use other means than direct coupling through wires and a series connection between the coils to create the desired currents, such as via various capacitive or inductive couplings, as is well-known by those practiced in related art. It should also be noted that coils of other shapes (polygonal, etc.) can also be used to approximate the desired current distributions, though possibly less well, and may be more convenient in some cases.

Figure 9A:
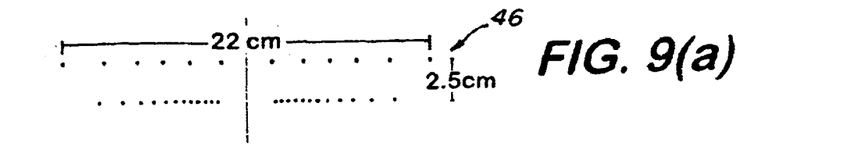
FIG. 9(a) is a diagram illustrating a cross section of a two-layer concentric loop coil of FIG. 8(b), though with more windings in each layer, according to an embodiment of the present invention.
Figure 9B:
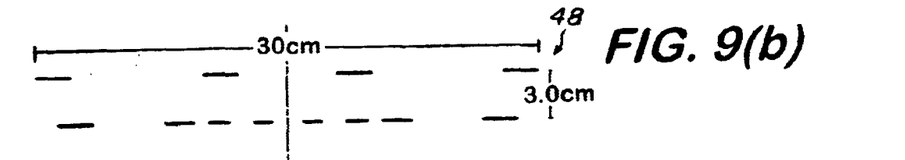
FIG. 9(b) is a diagram illustrating a cross section of a two-layer coil using wide flat wires according to an embodiment of the present invention.

Here we present the results for two prototype two-layer coils for comparison to theory. One of these coil arrays, coil array 46 shown in FIG. 9(*a*), uses a relatively large number of concentric loops to provide a reasonably accurate approximation to the continuous results. The other, a more practical design, is a fairly crude approximation using a small number of wide (ca. 2.5 cm) flat wires cut from copper sheet, shown in FIG. 9(*b*).

Magnetic field profiles were calculated taking advantage of the axial symmetry and using a two-dimensional electromagnetic finite element simulation software package (Ansoft Corporation Maxwell 2D version 9). These simulations do not include the wires leading into or out of the loops. Typically 20K or more finite elements were used. The simulations were performed at both dc and RF frequencies (~3 MHz) using copper conductors, appropriate for landmine detection: little difference could be seen.

Figure 10:
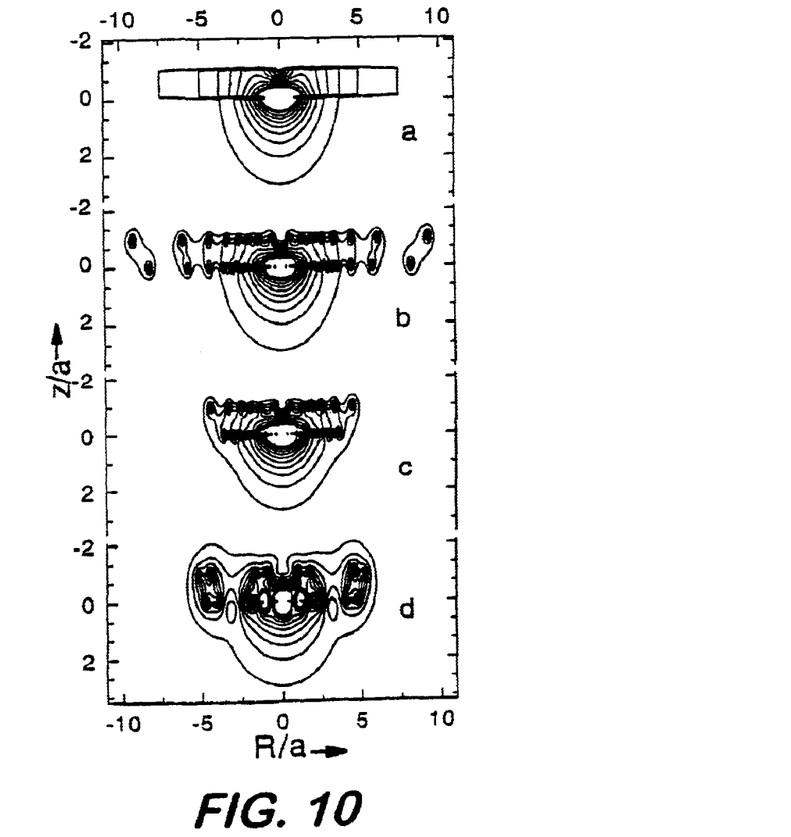
FIG. 10 is a diagram illustrating the results of the finite element computations for four self-shielded gradiometer configurations according to an embodiment of the present invention. Figures labeled c and d correspond to the coils shown in FIGS. 9A and 9B respectively.

FIG. 10 shows results of the finite element computations for four self-shielded gradiometer configurations starting with the continuous current distribution (see FIG. 7), an approximation to the continuous distribution using a large number of discrete wires carried out to large radius, the same discrete wires but truncated at a smaller radius, and a coil constructed using a relatively small number of discrete, but wide conductors, respectively. The latter two represent two prototype coils used for measurements. It can be see that the magnetic field profiles (away from the discrete wires) are very similar for all of these.

Figures 11, 12:
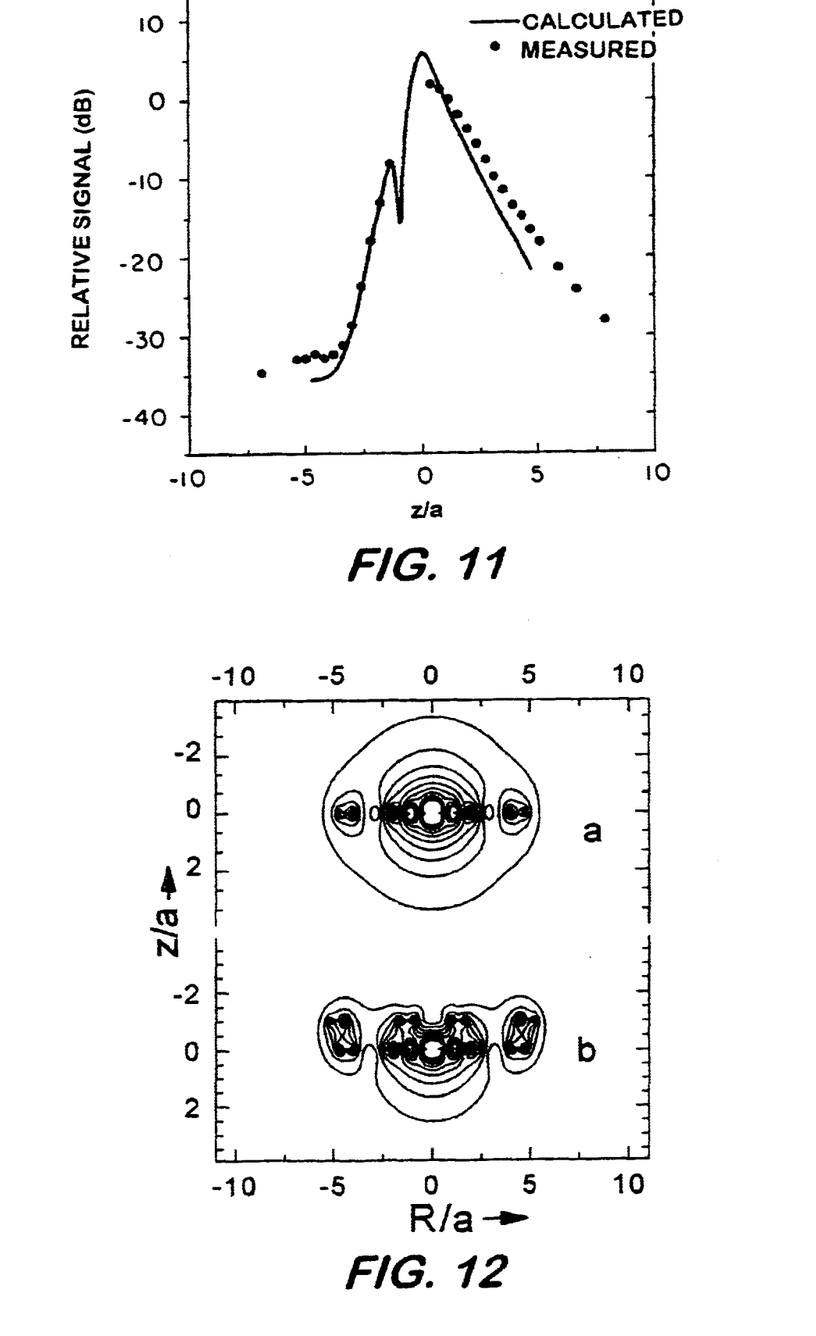
FIG. 11 is a diagram showing a comparison of the magnetic field profiles along the coil axis (r=0, z) for the computed field and the corresponding measured values for one of the prototype coils according to an embodiment of the present invention.
FIG. 12 is a diagram showing the computed field (a) which would be produced by one unit of current using only the bottom coil and the field (b) from the two-layer shielded coil according to an embodiment of the present invention.

FIG. 11 shows a comparison of the magnetic field profiles along the axis (r=0, z) for the computed field and the corresponding measured values for one of the prototype coils. The measurements were made at RF frequencies (3 MHz) using a 5 cm diameter, 3-turn pick-up coil and have been normalized to the value at z=a. For the numerical results the flux through a 5 cm diameter pickup coil was computed assuming the pick-up coil had no depth along the z-axis. The theory and experiment agree reasonably well. Experimentally, the measured signal does not decrease as rapidly on the inspection side of the coil as the computations suggest.

Figure 13:
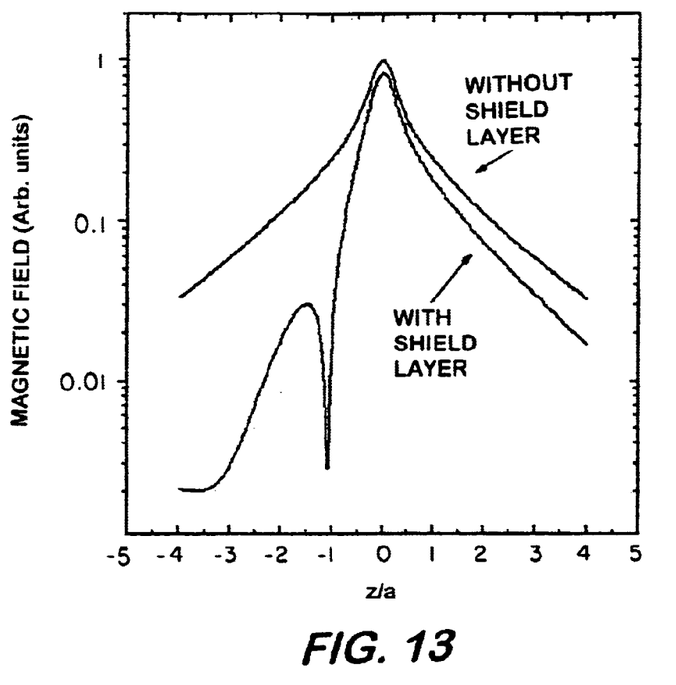
FIG. 13 is a diagram illustrating computed values for the on-axis magnetic fields for the two cases of FIG. 12 according to an embodiment of the present invention.

The addition of the second layer to provide shielding will have an undesirable impact on the magnitude of the field in the inspection region. FIGS. 12 and 13 illustrate this effect for one of our two-layer coils. In FIG. 12, (a) shows the computed field which would be produced by one unit of current if only the bottom coil is used (this field profile is essentially identical to what is obtained for the optimized single-layer coil), while (b) shows the field from the two-layer shielded coil (with d=a) when the same current is used in the bottom coil. Computed values for the on-axis magnetic fields for these two cases are shown in FIG. 13 where the self-shielding on the side away from the sample (z<0) and only a small reduction in the field in the inspection region (1<z/a<2) can be seen. It is also pointed out that the reduction in the field due to the second layer is less than that obtained for an equivalent conventional or "anti-symmetric" gradiometer with the same layer spacing, e.g. obtained using $A_1(\alpha)=-A_2(\alpha)$. The improvement over the anti-symmetric case depends on the layer spacing; it is about 15% near the center of the inspection region for the case shown in FIG. 10.

To achieve less reduction of the field in the inspection region, the two layers can be moved farther apart, though the diameter of the shield layer will also need to increase, with a corresponding decrease in the net current, to maintain the same degree of shielding. At the same time, however, the immunity to distant RF sources will be compromised as the spacing becomes a larger fraction of the wavelength, as discussed above. To determine an optimum layer spacing will depend on the size of the interfering RF signal(s). With no RF interference, an infinite layer spacing (i.e. removal of the shielding coil) yields the largest SNR.

To determine the optimum gradiometer spacing in detail requires knowledge of the changes in the size of the RF quadrupole radiation produced by the coil when used as a transmitter, the direction(s) to the source(s), and the expected size of the interference compared to thermal noise. That is, the optimum spacing will depend upon the ultimate application. Such a complete calculation is beyond the scope of this work. However, an estimate of the appropriate spacing can be made for relative changes one might expect.

The gradiometer is sensitive to the spatial gradients of the magnetic field measured over the size scale of the coil. Hence, to a reasonable approximation one can infer that for our gradiometer coils the sensitivity to radiation from distant sources will be proportional to the layer spacing, d. For NQR detection in the absence of interference, the SNR for the near-field NQR signal will depend on the product of two terms: the square root of the coil quality factor, Q, and the size of the magnetic field produced by the coil in the inspection region for a unit current excitation. We then proceed as follows. The optimum continuous current densities are computed as described above. In the example shown here the parameters is being optimized. Using those continuous current densities, we compute the magnetic field within the inspection region as a function of spacing, B(d). In our case we did this latter step using the finite element software discussed above after normalizing the currents so that the total circulating current in the lower coil was unity.

The field at the center of the inspection region was used. The changes in the coil quality factor with separation, q(d), are estimated using the results of the optimization and equation 13. Then the dependence of the SNR on the gradiometer spacing and in the absence of interference, $SNR_0(d)$ is $$SNR_0(d) \propto \frac{B(d)\sqrt{q(d)}}{B(d_0)\sqrt{q(d_0)}} \quad (20)$$

where $d_0$ is a spacing chosen as a reference point for comparison. Equation 20 then represents the size of the signal compared to thermal noise.

We assume the interfering signal has a coherence time long compared to $Q/\nu$, where $\nu$ is the operating frequency. This type of narrow band signal is typical of interference observed from broadcast stations. In that case the observed interfering signal also is proportional to the square root of the quality factor. Defining the parameter $\alpha$ as the magnitude of the interfering signal for a reference gradiometer spacing $d_0$ expressed in units where the thermal noise is 1, and using the approximation that the sensitivity to interference is linear in d, we then find $SNR_1$, the ratio of the desired signal to the sum of the thermal noise and the interfering signal, will depend on d according to $$SNR_1 \propto \frac{SNR_0(d)}{1+\alpha d/d_0}. \quad (21)$$

Figure 14:
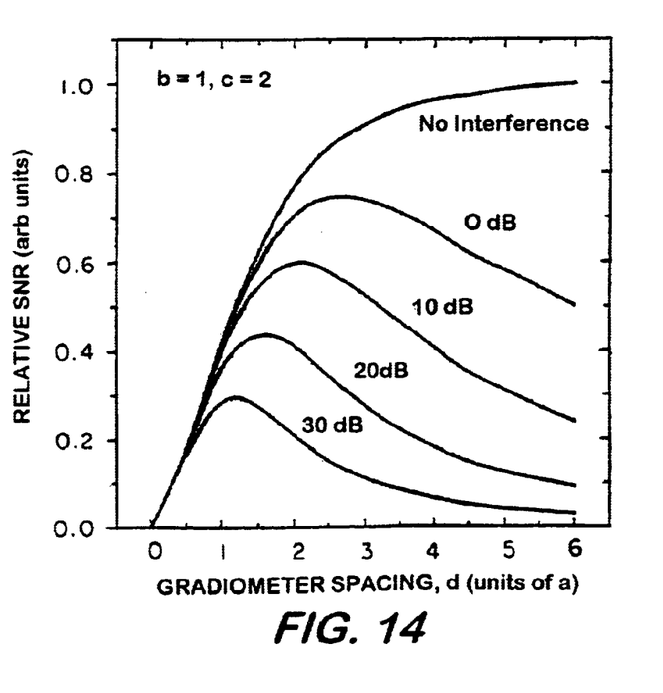
FIG. 14 is a graph showing the expected variation in SNR for a particular inspection region and for different interference levels and coil layer spacings according to an embodiment of the present invention.

For the two-layer gradiometer, FIG. 14 shows the results for various values of $\alpha$, expressed in dB, one particular inspection region, and $d_0=6a$.

Hence, for the inspection region used here and when interference is large (e.g. $\alpha=30$ dB), a layer spacing of approximately a, the inspection region radius, should be used as seen in FIG. 14: for that spacing the NQR SNR is reduced to about 30% of what one could achieve in the absence of interference. To achieve some limited degree of interference reduction without significantly reducing the NQR sensitivity, one would choose a spacing of about 3a or more. In that case some other means might be employed to separate the remaining interference from the desired signal.

The invention is relatively easy to implement in practice using approximations, as described above, to results computed using either a variational approach or through standard numerical matrix diagonalization techniques. The technique is applied in particular to develop a practical self-shielded asymmetric gradiometer that is relatively immune to RF interference from distant sources with a minimal compromise to its ability to sense RF from nearby sources, properties necessary for NQR detection of buried land mines.

According to the above embodiments of the present invention, the coil is virtually immune from common environmental noise sources, both electrical and magnetic, and hence eliminates the necessity of providing external RF shielding. This will have utility for NQR detection of explosives and perhaps obviate the need for external RF shielding in magnetic resonance imaging (MRI) applications. In particular, embodiments of the present invention can be applied to the use of NQR to the detection of nitrogenous or chlorine-containing explosives or narcotics carried in luggage, mail, small cargo, on a person, or buried in the ground. More generally, the above embodiments of the present invention can be used for improved detection of any material which has a magnetic resonance response that is unique compared to its surroundings.

Moreover, the above embodiments of the present invention are applicable to many different areas of RF signal detection. For example, the above embodiments of the present invention are applicable to NMR, NQR, MRI, broad line NMR studies such as stray field imaging of materials and possibly to pulsed Electron Paramagnetic Resonance (EPR) spectrometers at lower frequencies. Therefore, for example, the embodiments of the present invention are applicable to the detection of NMR resonance signals, NQR resonance signals and EPR resonance signals.

In most NQR, NMR and EPR applications, a common coil would typically be used as both a receiver coil and a transmitter coil, though this is not essential. In MRI separate coils would typically be used. The asymmetric gradiometer coils can be used for either or both of the transmitter and receiver coils.

There are many different types of probe configurations which can use a coil according to the above embodiments of the present invention. Thus, the present invention is not intended to be limited to any specific probe configuration.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A magnetic field gradiometer detector for detecting a material of interest positioned in a detecting region outside the detector, comprising:

a transmitter for generating an output signal at a selected frequency;

a receiver for detecting the signal;

a probe;

a switch coupling said receiver and said transmitter with said probe for alternately connecting and disconnecting said receiver and said transmitter to said probe, thereby switching said detector between a transmitting mode and a receiving mode; and wherein said probe comprises a gradiometer coil array including a first surface coil and a second surface coil wound in an opposite sense, said probe has a first side and an opposite second side, and wherein said first and second surface coils are configured asymmetrically such that the probe projects a magnetic field in the outside detecting region adjacent to said first side and is self-shielded on said second side of the probe to thereby detect the material of interest while shielding the detector from outside RF sources.

2. A detector as in claim 1, wherein the transmitting and/or receiving coil within the probe has been optimized based on a parameter that characterizes the effectiveness of the coil as a transmitter and/or a receiver.

3. A detector as in claim 2, wherein said parameter is selected from the group consisting of the filling factor (f), which is the ratio of magnetic energy which can be produced in all space to the magnetic energy within a specified inspection region, and the excitation efficiency (g), which is the magnetic field energy which can be produced within the inspection region per unit power dissipated in the coil.

4. A detector as in claim 1, wherein said first and second coils are spaced apart and substantially coaxial and electrically connected for transmitting and/or receiving a common but opposite current flow, and wherein said first coil has a different number of spaced-apart coil windings than said second coil, thereby shielding the second side of the probe while projecting the magnetic field in the outside detecting region adjacent to the first side of the probe.

5. A detector as in claim 4, wherein the spacing between the windings of each of said first and second coils is proportional to the inverse of a current density, $K_c^{(i)}(r)$, determined according to the equation:

$$K_c^{(i)}(r) \propto \int_0^\infty \alpha A_i(\alpha) J_1(\alpha r) d\alpha$$

where r is the radial distance from the center of the coil, i=1 or 2 corresponds to said first and second coils, respectively, $J_1$ is a Bessel function, where $A_1(\alpha)=-A_2(\alpha)e^{\alpha d}$ and d is the spacing between the two coils.

6. A detector as in claim 5 wherein $A_1(\alpha)$ is determined by finding an eigenfunction of a specified function $\tilde{G}(\alpha,\alpha')$ which has the largest eigenvalue.

7. A detector as in claim 6 wherein $$\tilde{G}(\alpha',\alpha) = G(\alpha',\alpha) \frac{1-e^{-2\alpha d}}{\sqrt{1-(2\alpha d+1)e^{-2\alpha d}}}$$

$$\frac{1-e^{-2\alpha' d}}{\sqrt{1-(2\alpha' d+1)e^{-2\alpha' d}}} \text{ and}$$

$$G(\alpha',\alpha) = a\frac{\alpha\alpha'}{\alpha^2-\alpha'^2}\left(e^{-(\alpha+\alpha')b} - e^{-(\alpha+\alpha')c}\right)(J_1(\alpha a)J_0(\alpha' a) - J_0(\alpha a)J_1(\alpha' a))$$

where $J_1$ and $J_0$ are Bessel functions, a, b, and c are dimensions characteristic of a desired inspection region and $A_1(\alpha)$ is related to the eigenfunction with the largest eigenvalue, $\tilde{A}(\alpha)$, by $$\tilde{A}(\alpha) = A_1(\alpha)\sqrt{1-(2\alpha d+1)e^{-2\alpha d}}.$$

8. A detector as in claim 4, wherein said first and second coils are about 30 cm. in diameter.

9. A detector as in claim 1, wherein the coil array has a quality factor greater than about 150.

10. A detector as in claim 1, further comprising tuning elements.

11. An NQR magnetic radiofrequency gradiometer coil array, comprising:
a first surface coil and a second surface coil wound in an opposite sense, and wherein said first and second surface coils are configured asymmetrically such that the coil array projects a magnetic field in a detecting region outside a first side and is self-shielded on a second, opposing side of the coil array to thereby detect a material of interest while shielding the coil array from outside RF sources.

12. A coil array as in claim 11, wherein the transmitting and/or receiving coil within the probe has been optimized based on a parameter that characterizes the coil efficiency.

13. A coil array as in claim 12, wherein said parameter is selected from the group consisting of the filling factor (f), which is the ratio of magnetic energy which can be produced in all space to the magnetic energy within a specified inspection region, and the excitation efficiency (g), which is the magnetic field energy which can be produced within the inspection region per unit power dissipated in the coil.

14. A coil array as in claim 11, wherein said first and second coils are spaced apart and substantially coaxial and electrically connected for transmitting and/or receiving a common but opposite current flow, and wherein said first coil has a different number of spaced-apart coil windings than said second coil, thereby shielding the second side of the probe while projecting the magnetic field in the outside detecting region adjacent to the first side of the probe.

15. A coil array as in claim 14, wherein the spacing between the windings of each of said first and second coils is proportional to the inverse of a current density determined according to the equation:

$$K_c^{(i)}(r) \propto \int_0^\infty \alpha A_i(\alpha) J_1(\alpha r) d\alpha$$

where r is the radial distance from the center of the coil, i=1 or 2 corresponds to said first and second coils, respectively, $J_1$ is a Bessel function, where $A_1(\alpha)=-A_2(\alpha)e^{\alpha d}$ and d is the spacing between the two coils.

16. A coil array as in claim 15 wherein $A_1(\alpha)$ is determined by finding an eigenfunction of a specified function $\tilde{G}(\alpha,\alpha')$ which has the largest eigenvalue.

17. A coil array as in claim 16 wherein $$\tilde{G}(\alpha',\alpha) = G(\alpha',\alpha) \frac{1-e^{-2\alpha d}}{\sqrt{1-(2\alpha d+1)e^{-2\alpha d}}}$$

$$\frac{1-e^{-2\alpha' d}}{\sqrt{1-(2\alpha' d+1)e^{-2\alpha' d}}} \text{ and}$$

$$G(\alpha',\alpha) = a\frac{\alpha\alpha'}{\alpha^2-\alpha'^2}\left(e^{-(\alpha+\alpha')b} - e^{-(\alpha+\alpha')c}\right)(J_1(\alpha a)J_0(\alpha' a) - J_0(\alpha a)J_1(\alpha' a))$$

where $J_1$ and $J_0$ are Bessel functions, a, b, and c are dimensions characteristic of a desired inspection region and $A_1(\alpha)$ is related to the eigenfunction with the largest eigenvalue, $\tilde{A}(\alpha)$, by $$\tilde{A}(\alpha) = A_1(\alpha)\sqrt{1-(2\alpha d+1)e^{-2\alpha d}}.$$

18. A coil array as in claim 14, wherein said first and second coils are about 30 cm. in diameter.

19. A coil array as in claim 11, wherein the coil array has a quality factor greater than about 150.

20. A coil array as in claim 11, further comprising:
a transmit/receive mechanism to switch between a first state where the coil is used to receive, and a second state where the coil is used to transmit.

21. A coil array as in claim 11, wherein the coil array is for use in one of the group consisting of Magnetic Resonance Imaging (MRI), Nuclear Magnetic Resonance (NMR), Nuclear Quadrupole Resonance (NQR) and Electron Paramagnetic Resonance (EPR).

22. A coil array as in claim 11, further comprising tuning elements.

23. A method for analyzing a sample by magnetic resonance, comprising the steps of:
(a) generating a train of radio frequency pulses having a predetermined frequency;
(b) transmitting said train of radio frequency pulses to a magnetic gradiometer coil array, wherein said gradiometer array comprises a first surface coil and a second surface coil wound in an opposite sense, and wherein said first and second surface coils are configured asymmetrically such that the coil array projects a magnetic field in a detecting region outside a first side and is self-shielded on a second, opposing side of the coil array;
(c) irradiating said sample in response to said train of radio frequency pulses transmitted to said coil at said step (b);

(d) detecting a signal in response to irradiating the specimen at said step (c); and (e) receiving said signal detected at said step (d).

24. A method as in claim 22, wherein the transmitting and/or receiving coil array within the probe has been optimized based on a parameter that characterizes the coil efficiency.

25. A method as in claim 24, wherein said parameter is selected from the group consisting of the filling factor (f), which is the ratio of magnetic energy which can be produced in all space to the magnetic energy within a specified inspection region, and the excitation efficiency (g), which is the magnetic field energy which can be produced within the inspection region per unit power dissipated in the coil.

26. A method as in claim 23, wherein said first and second coils are spaced apart and substantially coaxial and electrically connected for transmitting and/or receiving a common but opposite current flow, and wherein said first coil has a different number of spaced-apart coil windings than said second coil, thereby shielding the second side of the probe while projecting the magnetic field in the outside detecting region adjacent to the first side of the probe.

27. A method as in claim 26, wherein the spacing between the windings of each of said first and second coils is proportional to the inverse of a current density, $K_c^{(i)}(r)$, determined according to the equation:

$$K_c^{(i)}(r) \propto \int_0^\infty \alpha A_i(\alpha) J_1(\alpha r) d\alpha$$

where r is the radial distance from the center of the coil, i=1 or 2 corresponds to said first and second coils, respectively, $J_1$ is a Bessel function, where $A_1(\alpha) = -A_2(\alpha)e^{\alpha d}$ and d is the spacing between the two coils.

28. A method as in claim 27 wherein $A_1(\alpha)$ is determined by finding an eigenfunction of a specified function $\tilde{G}(\alpha, \alpha')$ which has the largest eigenvalue.

29. A method as in claim 28 wherein $$\tilde{G}(\alpha', \alpha) = G(\alpha', \alpha) \frac{1 - e^{-2\alpha d}}{\sqrt{1 - 2(\alpha d + 1)e^{-2\alpha d}}}$$

$$\frac{1 - e^{-2\alpha' d}}{\sqrt{1 - 2(\alpha' d + 1)e^{-2\alpha' d}}} \text{ and}$$

$$G(\alpha', \alpha) = a \frac{\alpha \alpha'}{\alpha^2 - \alpha'^2} \left( e^{-(\alpha+\alpha')b} - e^{-(\alpha+\alpha')c} \right)$$

$$(J_1(\alpha a) J_0(\alpha a) - J_0(\alpha a) J_1(\alpha' a))$$

where $J_1$ and $J_0$ are Bessel functions, a, b, and c are dimensions characteristic of a desired inspection region and $A_1(\alpha)$ is related to the eigenfunction with the largest eigenvalue, $\tilde{A}(\alpha)$, by $$\tilde{A}(\alpha) = A_1(\alpha)\sqrt{1-(2\alpha d+1)e^{-2\alpha d}}.$$

30. A method as in claim 26, wherein said first and second coils are about 30 cm. in diameter.

31. A method as in claim 23, wherein the coil array has a quality factor greater than about 150.

32. A method as in claim 23, further comprising providing tuning elements for said coil array.

* * * * *